United States Patent
Schawitsch

(10) Patent No.: US 9,627,951 B2
(45) Date of Patent: Apr. 18, 2017

(54) ELECTRIC POWER SYSTEM WITH REGENERATION

(71) Applicant: Kevin Schawitsch, Payson, IL (US)

(72) Inventor: Kevin Schawitsch, Payson, IL (US)

( * ) Notice: Subject to any disclaimer, the term of this patent is extended or adjusted under 35 U.S.C. 154(b) by 727 days.

(21) Appl. No.: 13/715,104

(22) Filed: Dec. 14, 2012

(65) Prior Publication Data

US 2014/0001905 A1 Jan. 2, 2014

Related U.S. Application Data

(60) Provisional application No. 61/663,543, filed on Jun. 23, 2012.

(51) Int. Cl.
*H02K 47/14* (2006.01)
*H02K 7/00* (2006.01)
*H02K 7/18* (2006.01)

(52) U.S. Cl.
CPC ............. *H02K 47/14* (2013.01); *H02K 7/006* (2013.01); *H02K 7/1807* (2013.01)

(58) Field of Classification Search
CPC ........ H02K 7/1807; H02K 7/20; H02K 47/14; H02K 7/006
See application file for complete search history.

(56) References Cited

U.S. PATENT DOCUMENTS

| 3,660,671 A | 5/1972 | Peterson |
| 3,883,794 A | 5/1975 | Sivley |
| 4,095,664 A | 6/1978 | Bray |
| 4,242,617 A | 12/1980 | Jennings |
| 4,413,698 A | 11/1983 | Conrad et al. |
| 4,477,764 A * | 10/1984 | Pollard .......................... 320/116 |
| 4,602,694 A * | 7/1986 | Weldin ................... B60K 16/00 180/2.2 |
| 4,689,531 A | 8/1987 | Bacon |
| 5,686,818 A | 11/1997 | Scaduto |

(Continued)

FOREIGN PATENT DOCUMENTS

| CA | 2694395 | 8/2011 |
| GB | 2270807 | 3/1994 |

(Continued)

OTHER PUBLICATIONS

Vehicular Electric Power Systems: Land, Sea, Air, and Space Vehicles Ch. 8 (Mehrdad Ehsani et al. eds. CRC 2003).*

(Continued)

*Primary Examiner* — Terrance Kenerly
(74) *Attorney, Agent, or Firm* — Barnes & Thornburg LLP; Jeffrey R. Stone

(57) ABSTRACT

A power system with regeneration may include an electric power storage element, an electric motor in electrical communication with the electric power storage element, a rotatable shaft operably coupled to the electric motor for rotation by the electric motor and adapted to provide rotational energy to a power take-off device, and a regeneration component operably coupled to the rotatable shaft and adapted for converting rotational energy of the shaft to electrical energy, the regeneration component being in electrical communication with the electric power storage element and adapted to recharge the electric power storage element.

4 Claims, 6 Drawing Sheets

(56) References Cited

U.S. PATENT DOCUMENTS

| | | | |
|---|---|---|---|
| 5,689,174 A * | 11/1997 | Pacheco, Sr. | ............ B60K 6/26 180/65.1 |
| 5,804,948 A | 9/1998 | Foust | |
| 6,044,922 A | 4/2000 | Field | |
| 6,531,849 B2 | 3/2003 | Nakamura et al. | |
| 6,708,789 B1 | 3/2004 | Albuquerque De Souza E Silva | |
| 6,734,645 B2 | 5/2004 | Auerbach | |
| 6,856,033 B2 | 2/2005 | Patel | |
| 6,924,567 B2 | 8/2005 | Killian et al. | |
| 7,183,746 B1 | 2/2007 | Carter | |
| 7,281,595 B2 | 10/2007 | Bissontz | |
| 7,293,621 B2 | 11/2007 | Long | |
| 7,533,746 B2 | 5/2009 | Yamaguchi | |
| 7,733,039 B2 | 6/2010 | Su | |
| 7,803,024 B2 | 9/2010 | Su | |
| 7,876,065 B2 | 1/2011 | Grant, Sr. | |
| 8,091,656 B2 | 1/2012 | Rankin et al. | |
| 8,872,403 B2 * | 10/2014 | Galvan | .................. H02K 53/00 310/113 |
| 2001/0039230 A1 | 11/2001 | Severinsky et al. | |
| 2004/0262062 A1* | 12/2004 | Berbari | .................. B60K 6/105 180/165 |
| 2005/0054480 A1 | 3/2005 | Ortmann et al. | |
| 2005/0236901 A1 | 10/2005 | Killian et al. | |
| 2006/0082066 A1 | 4/2006 | Woods, Jr. | |
| 2006/0102393 A1 | 5/2006 | Tumback et al. | |
| 2007/0246943 A1* | 10/2007 | Chang | ....................... H02J 3/28 290/44 |
| 2008/0054827 A1* | 3/2008 | States | ................... H02K 7/025 318/108 |
| 2009/0173066 A1 | 7/2009 | Duray | |
| 2009/0200089 A1 | 8/2009 | Friedmann | |
| 2011/0084498 A1 | 4/2011 | Lemus | |
| 2011/0316377 A1 | 12/2011 | Warmenhoven | |
| 2012/0028515 A1 | 2/2012 | Stasolla et al. | |
| 2012/0091731 A1 | 4/2012 | Nelson | |
| 2012/0187919 A1 | 7/2012 | Andersson et al. | |
| 2012/0217905 A1 | 8/2012 | Anthes | |
| 2013/0327010 A1* | 12/2013 | Muller | ..................... F01D 1/32 60/39.01 |

FOREIGN PATENT DOCUMENTS

| | | |
|---|---|---|
| GB | 2408157 | 5/2005 |
| GB | 2489759 | 10/2012 |
| KR | 20020069543 | 9/2002 |
| KR | 20100061429 | 6/2010 |
| WO | WO2009/157728 | 12/2009 |
| WO | 2010/019527 | 2/2010 |
| WO | 2011/078636 | 6/2011 |

OTHER PUBLICATIONS

Axle_alternator, "Can you use an alternator or an axle to recharge batteries?". Taken from the Internet on Nov. 7, 2012 from http://www.instructables.com/answers/Can-you-use-an-alternator-on-an-axle-to-recharge-b/.

* cited by examiner

ELECTRIC POWER SYSTEM WITH REGENERATION

CROSS REFERENCE TO RELATED APPLICATION

This application claims priority to U.S. Provisional Application No. 61/663,543 filed Jun. 23, 2012 entitled Electric Power Regeneration Device and Method of Charging, the contents of which are hereby incorporated by reference herein in their entirety.

FIELD OF THE INVENTION

The present application relates generally to a system for releasing power from a source while also regenerating the source. More specifically, this application relates to using electric energy stored in a source to perform work while also regenerating the source of electric energy. Still more particularly, the present application relates to a using a battery or batteries to power an electric motor or motors for turning a shaft and recapturing the rotational energy of the shaft and returning it to the battery or batteries in the form of electrical energy.

BACKGROUND

Motor vehicles commonly use a battery in conjunction with a starter to start a combustion engine. Once the combustion engine is running, the engine may rely on an alternator to provide electricity needed by spark plugs to continually spark and maintain the engine in a running condition. In addition, the electricity provided by the alternator may be used to recharge the battery and/or to run various electronic accessories of the vehicle.

In the case of a hybrid vehicle, a combustion engine together with an electric motor may be used to power the vehicle. In this case, while the combustion engine may function similarly to a non-hybrid, a computer is also used to switch between powering the vehicle with the electric motor and the combustion engine. The electric motor may be powered by a rechargeable battery that is charged using regenerative braking. In the case of fully electric vehicles, regenerative braking may also be used.

SUMMARY

In one embodiment, an electric power system with regeneration, may include an electric power storage element, an electric motor in electrical communication with the electric power storage element, a rotatable shaft operably coupled to the electric motor for rotation by the electric motor and adapted to provide rotational energy to a power take-off device, and a regeneration component operably coupled to the rotatable shaft and adapted for converting rotational energy of the shaft to electrical energy. The regeneration component may be in electrical communication with the electric power storage element and adapted to recharge the electric power storage element. In some embodiments, the electric power storage element may be one or more batteries and the regeneration component may be one or more alternators. Some embodiments may include a computing device in electrical communication with the electric motor for control of the electric motor. In some embodiments, the power take-off device may be a drive train and the drive train may be operably coupled to the rotatable shaft for movingly powering a vehicle. In other embodiments, the power take-off device may be a generator and the generator may be operably coupled to the rotatable shaft and adapted for converting the rotational energy of the shaft into electrical energy. In some embodiments, a battery charger may be provided and may be electrically coupled to the generator and configured for charging the electric power storage element.

While multiple embodiments are disclosed, still other embodiments of the present teachings will become apparent to those skilled in the art from the following detailed description, which shows and describes illustrative embodiments. As will be realized, the teachings are capable of modifications in various aspects, all without departing from the spirit and scope of the present teachings. Accordingly, the drawings and detailed description are to be regarded as illustrative in nature and not restrictive.

DETAILED DESCRIPTION

The present application relates to electric power systems with regeneration. The systems may include one or more batteries for powering an electric motor to turn a shaft, such as a drive shaft or drive train for advancing a vehicle, for example. The systems may also include a regeneration component for converting rotational energy from the shaft back into electric energy for recharging the one or more batteries. The resulting system may maintain the batteries in a state of charge longer than it would without the regeneration system and, thus, it may extend the available time for using the system between battery charging sessions.

The systems described herein may be used in a variety of ways including powering vehicles such as automobiles, all-terrain vehicles (ATVs), buses, trucks, boats, and airplanes, and including autonomous vehicles. Such powering may include providing motion related power to such vehicles, but it may also include providing electrical power by way of a generator, for example, that reconverts the rotational energy from the shaft back into electrical energy. The electrical energy may be used by such vehicles allowing for running of accessories such as lights, computers, actuators, motors, and other accessories. While some of the systems described herein may be described as being advantageous for vehicles, the systems may be used as stand-alone devices separate and apart from use on a vehicle. For example, a system may include a battery for powering an electric motor to turn a shaft, which may be used to run a generator. A regeneration component may also be provided and may be operably coupled to the shaft to convert rotational energy from the shaft back into electrical energy for recharging the battery. The generator may include electrical connections, such as outlets for plugging in of electrical devices. In one embodiment, the system may, thus, be used as a source for emergency power, for camping, or for situations where electrical power is not readily available. Still other uses of the systems described herein are available.

Figure 1:
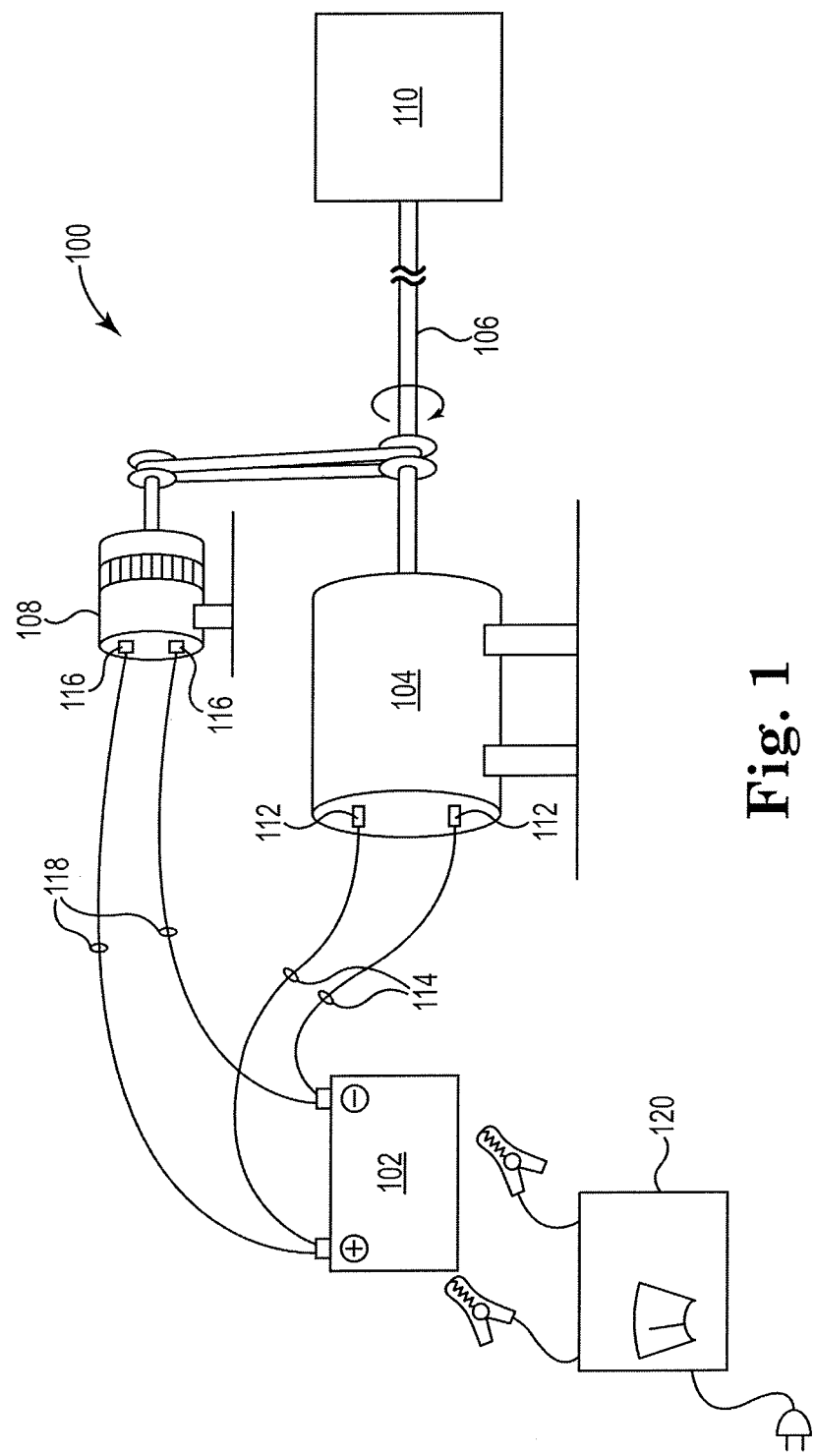
FIG. 1 shows an electric power system with regeneration, according to some embodiments.

Referring now to FIG. 1, an electric power system 100 with regeneration is shown. The system 100 may include one or more electric power storage elements 102, one or more electric motors 104, one or more rotatable shafts 106, and one or more regeneration components 108. The system 100 may be used for providing rotational power to a power take-off device 110 such as a drive shaft or other portion of a drive train of a vehicle or it may be used to power a generator in conjunction with a vehicle or apart from a vehicle for supplying electrical power to electronic devices. Still other types of take-off devices 110 and uses of the system 100 may be provided. It is to be appreciated that where elements are referred to individually, one or more of the elements may be provided. In particular, where an electric power storage element 102, or a motor 104, a shaft 106, or a regeneration component 108 is discussed, it is to be appreciated that one or more of these items may be provided in a wide array of combinations. In the embodiment of FIG. 1, one of each of these elements are shown and, as such, the elements may be referred to as being single elements for purposes of FIG. 1. However, it is to be appreciated that multiple elements may be provided.

The electric power storage element 102 may be configured for storing electrical energy, discharging the energy, and may further be configured for being recharged. In some embodiments, the electric power storage element 102 may be an acid-based battery such as a car or marine type battery and may be a shallow cycle or deep cycle battery. The battery may include a positive pole and a negative pole and each pole may be marked accordingly. The poles may be adapted for making electrical connections to the battery with electrical lines. The battery may be a 6V battery, a 12 V battery, or another size battery may be provided. In other embodiments, the electric power storage element 102 may be a Nickel Cadmium or Nickel Metal Hydride battery, for example, or another battery type may be used. Still other battery types may be provided and other types of electrical power storage elements 102 may be provided such as capacitors or other electrical energy storing devices.

The electric motor 104 may be configured for electrical connection to the electric power storage element 102 as shown. That is the electrical motor 104 may have a pair of electrical contacts 112 for connection of wires 114. The motor 104 may be connected to the electric power storage element 102 by connecting wires 114 between respective poles of a battery, for example, and the contacts 112 of the motor 104. While not shown in this particular embodiment, an on/off switch may be provided between the motor 104 and the battery to control when the system 100 is on and when it is off and, in some embodiments, a motor control such as a speed control or a computer control system may be provided for controlling the motor 104. The electric motor 104 may be most any type or brand of electric motor and it may be configured for converting the electrical energy supplied by the battery to rotational energy. In one embodiment, the motor 104 may be a EE-100A-33 D&D Motor having a horsepower of approximately 5½. Still other types of motors may be provided and more than one motor may be provided.

The rotatable shaft 106 may be operably coupled to the electric motor 104 such that the shaft is caused to rotate when the motor 104 rotates. That is, when the electric motor 104 is electrically excited by the battery 102, the motor 104 may convert the electrical energy of the battery 102 to rotation causing the shaft 106 to rotate. The coupling between the shaft 106 and the motor 104 may be a direct coupling, as shown. That is, the shaft 106 may extend directly from the motor 104 and, thus, rotate at the same rate as the motor 104. In other embodiments, the shaft 106 may engage the motor 104 with a system of gears or a transmission allowing for the rotation rate of the shaft 106 to be selected to be the same, some portion of, or a multiple of the motor rotation rate. In other embodiments, the shaft 106 may be coupled to the motor 104 with a belt and pulley or chain and sprocket system. Each of these systems may also allow for the rotation rate of the shaft 106 relative to the motor rate to be selected.

The shaft 106 may be a solid or hollow shaft that is generally elongate and rotatable about an axis. The shaft 106 may have a generally round cross-section or it may be square, rectangular, triangular or it may have another cross-section. In some embodiments, the shaft 106 might not be uniform along its length and may include a plurality of cams or other features for rotatably engaging or interfacing with valves, actuators, or other components positioned along the length of the shaft 106.

The shaft 106 may be a part of the electric power system 100 and may be adapted for interaction with a power take-off device 110 at an end thereof as shown or along its length. However, the shaft 106 may provide a convenient location for operably coupling multiple devices to the rotational energy provided by the motor. Accordingly, other approaches to harnessing the rotational energy of the motor may be provided including direct connections to the motor with gears or sprockets and the shaft 106, may be omitted. In other embodiments, multiple shafts 106 may be provided. For example, a dedicated shaft 106 may be provided for connection to the regeneration component 108 while other shafts may be provided for take-off devices, for example. In still other embodiments, the shaft 106 may be both a part of the electric power system 100 and a part of the take-off device 110. That is, in the case of a vehicle for example, the motor 104 may be directly connected to the drive train or drive axle of the vehicle and the shaft 106 may thus be the shaft 106 for rotating as a result of rotation imparted by the motor 104 and the shaft 106 may also function as the drive axle of the vehicle. In other embodiments, the shaft 106 of the electric power system 100 may be coupled to a separate shaft that may be part of a separate or isolated device 110. Accordingly, as the regeneration component 108 is described below, it is to be appreciated that the regeneration component 108 may be coupled to most any rotating shaft 106 that is operably coupled to the motor 104. This may include a shaft 106 extending directly from the motor 104 or another shaft 106 operably coupled to the motor 104. In some embodiments, a particular shaft 106 may be provided to accommodate the regeneration component 108 while another shaft may be provided to power a take-off device 110.

The regeneration component 108 may be configured to recover or recapture some of the energy provided to the motor 104 by the battery 102. The regeneration component 108 may, thus, be operably coupled to the shaft 106 and adapted to convert rotating energy of the shaft 106 to electrical energy. Like the operable coupling of the shaft 106 to the motor 104, the regeneration component 108 may be directly connected to the shaft 106 on an end thereof or it may be coupled with a system of gears or a belt and pulley or chain and sprocket system may be used. In the case of gears, belt/pulleys, or chain/sprockets, the rotation rate of the regeneration component 108 may be selected as some fraction or multiple of the rotation rate of the shaft 106. The regeneration component 108 may include an operable clutch or other selective engagement mechanism allowing for selectively engaging the rotatable shaft 106 or the regeneration component 108 may be constantly engaged with the rotatable shaft 106.

In one embodiment, the regeneration component 108 may be an alternator. The alternator may be configured to convert a portion of the rotational energy of the shaft 106 to electrical energy for recharging the battery 102. The regeneration component 108 may be one of several known alternators commonly used in automobiles or other contexts that are configured for converting rotational energy first to AC power and then to DC power. In one embodiment, the alternator may include a rotor with an iron core surrounded by a wire coil that is capped on each end with claw-shaped finger poles. The wire coil of the rotor may have a DC current passing therethrough to create a magnetic field in the coil. The finger poles of each cap may extend along the sides of the rotor and may alternate with one another around the circumference of the rotor providing north/south alternating poles around the circumference of the rotor. The rotor may be rotatably positioned within a stator and the stator may include a plurality of wire windings having axes arranged generally orthogonal to the peripheral surface of the rotor. For example, a series of three consecutive and repeating wire windings may be provided to create a three phase alternator. As the rotor rotates within the stator, the poles of the rotor may pass by the windings creating an AC current in the windings. The AC current may be converted to a DC current and the DC current may be used to charge the battery. The alternator may also include a pair of contacts 116 for electrical connection of leads 118 for electrically coupling the alternator to the electric power storage element 102, or batteries. A regulator may also be provided for monitoring the DC current in the rotor coil (i.e., the field current) and, thus, regulating the energy output of the alternator. In one embodiment, the alternator may be a self-excited isolated alternator and the regulator may be arranged in the alternator.

As shown in FIG. 1, a recharging component 120 may also be provided for situations where the electric energy storage element 102 is no longer charged or has a charge that is insufficient to perform a task. The recharging component 120 may be plugged into a power source such as an AC power outlet and the recharging component 120 may be connected to the poles of the energy storage element 102, or battery, to charge the battery and bring it back to a state of charge or a charge sufficient to complete a task. While the recharging component 120 has been shown as an isolated device, the recharging component 120 may, alternatively, be mounted to or otherwise coupled to the system 100 for ready access when it is needed. In some embodiments the recharging component may be adapted to be plugged into a wall outlet, for example, and may be further configured to maintain the battery 102 in a state of charge such that, at times of need of the system, the battery 102 is sure to be fully charged. During use, the recharging component may be disconnected from the battery 102 and the system may run on the power of the battery 102.

As mentioned, the system 100 of FIG. 1 may be used with one or more take-off devices 110. It is to be appreciated that while the term power take-off device is commonly used in the context of farm implements, the term take-off device 110 is used herein as including any device capable of harnessing rotational energy from a shaft or motor, for example. In one embodiment, the take-off device 110 may be a vehicle such as a golf cart, automobile, go kart, or other vehicle. In this embodiment, the rotating shaft 106 of the electric power system 100 may be operably coupled to a drive train or drive axle of the vehicle thereby proving rotational power to the vehicle and allowing for rotation of wheels or tracks, for example. In another embodiment, the take-off device 110 may be a boat and the rotatable shaft 106 may be operably coupled to a propulsion system such as a shaft and propeller. In still other embodiments, the take-off device 110 may be a drive train or axle of an ATV or the take-off device 110 may be one or more farm implements or devices. Generally, any device that may use rotational energy to function may be operably coupled to the rotatable shaft 106 of the system 100.

Figure 3:
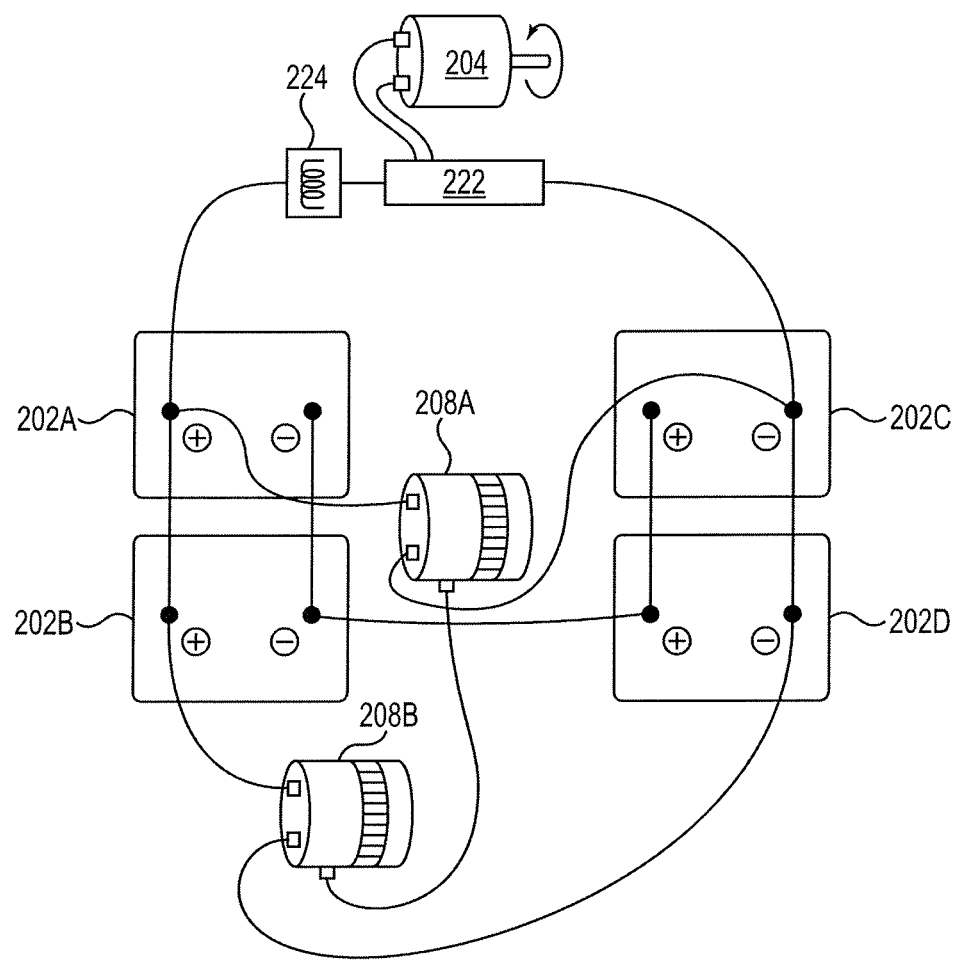
FIG. 3 shows a wiring diagram of the system of FIG. 2, according to some embodiments.
Figure 4:
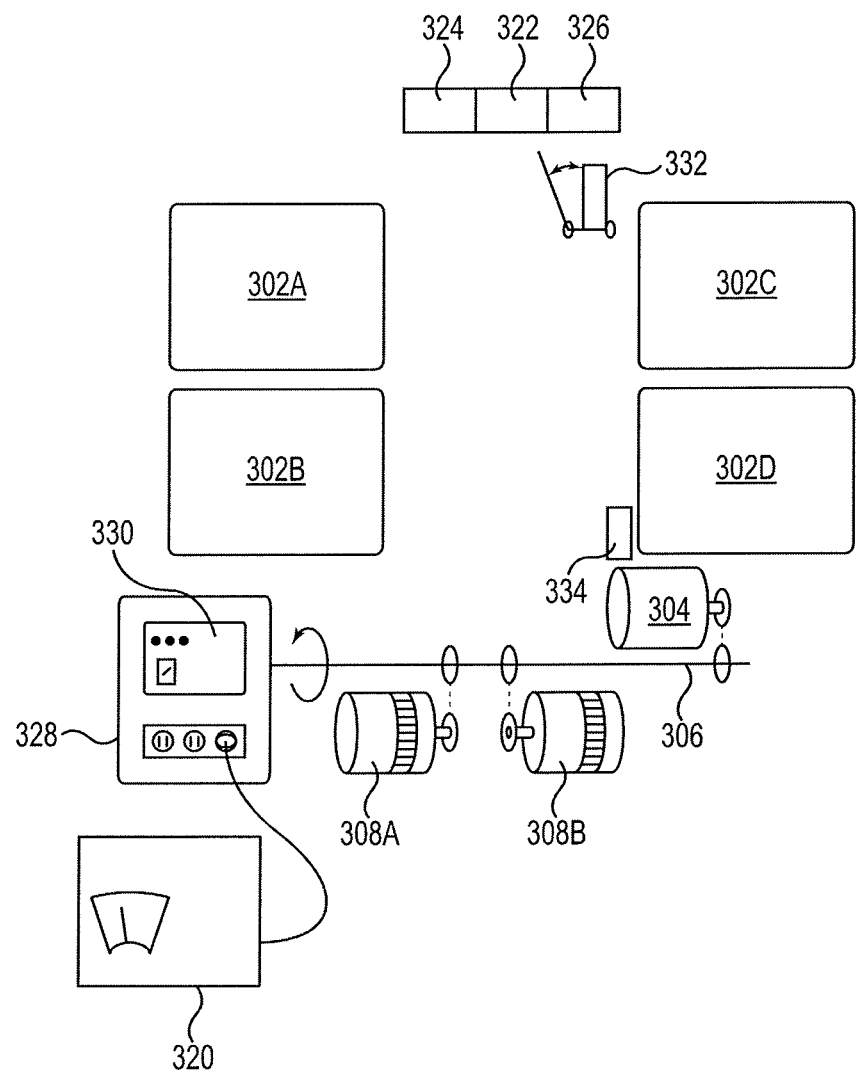
FIG. 4 shows yet another electric power system with regeneration, according to some embodiments.
Figure 5:
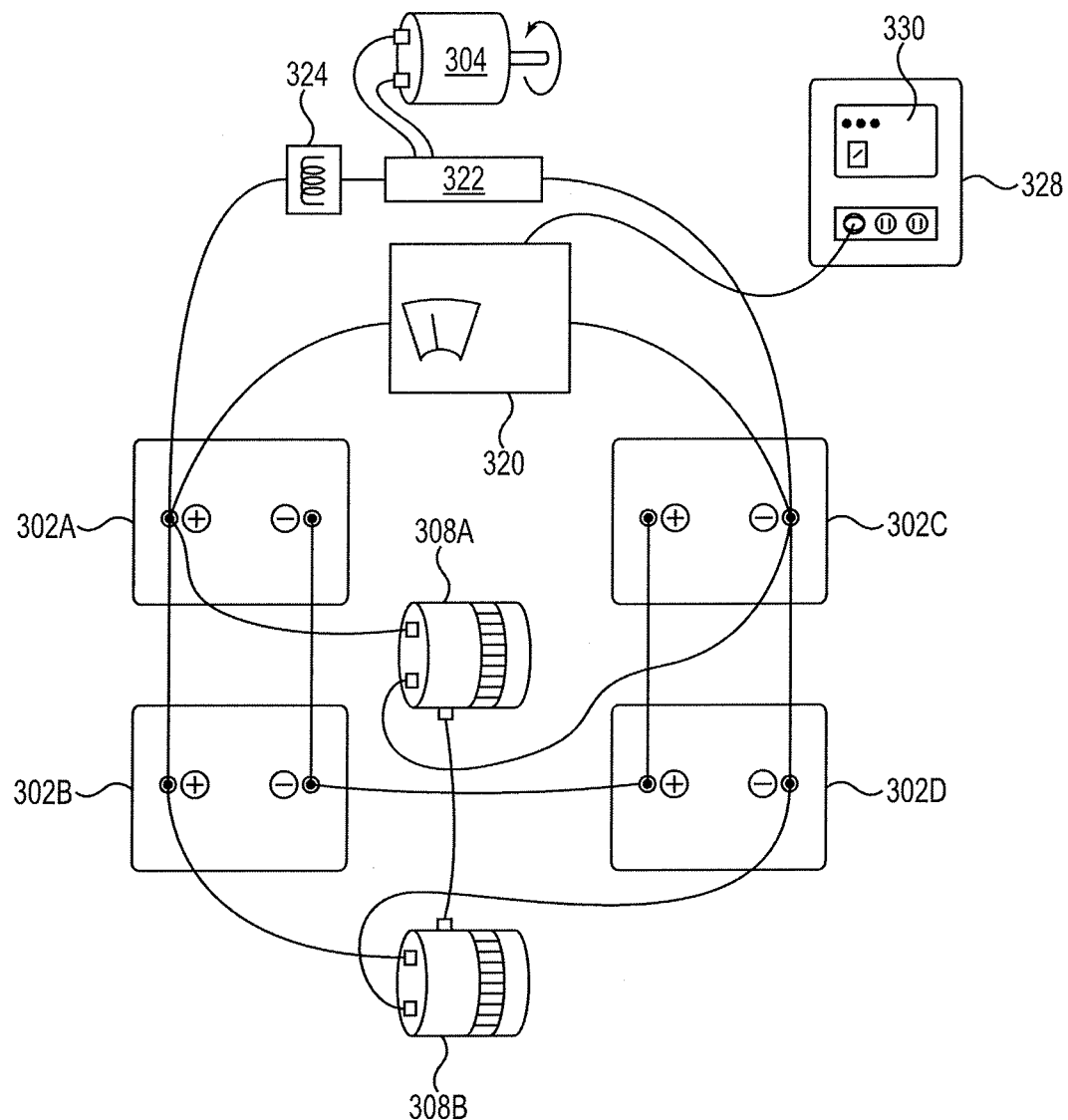
FIG. 5 shows a wiring diagram of the system of FIG. 4, according to some embodiments.

In addition to the take-off devices 110 described, a take-off device 110 in the form of an electric generator may also be operably coupled to the rotatable shaft 106. That is, a generator may be coupled to the shaft 106 with one of the take-off devices 110 described or a generator may be the sole take-off device 110 provided. In either case, the generator may convert the rotational energy of the rotatable shaft 110 to electrical energy and electronic devices may be connected to the generator to provide the electronic devices with electrical power. As will be described with respect to FIGS. 4 & 5, having converted the rotational energy to electric energy with the generator, additional electric energy may be provided back to the battery 102 from the generator. For example, a battery charger may be plugged into the generator and may also be connected to the battery to supply recharging energy to the battery. While this is shown in FIGS. 4 & 5 and not in FIGS. 1-3, the embodiments of FIGS. 1-3, may also take advantage of this concept.

Figure 2:
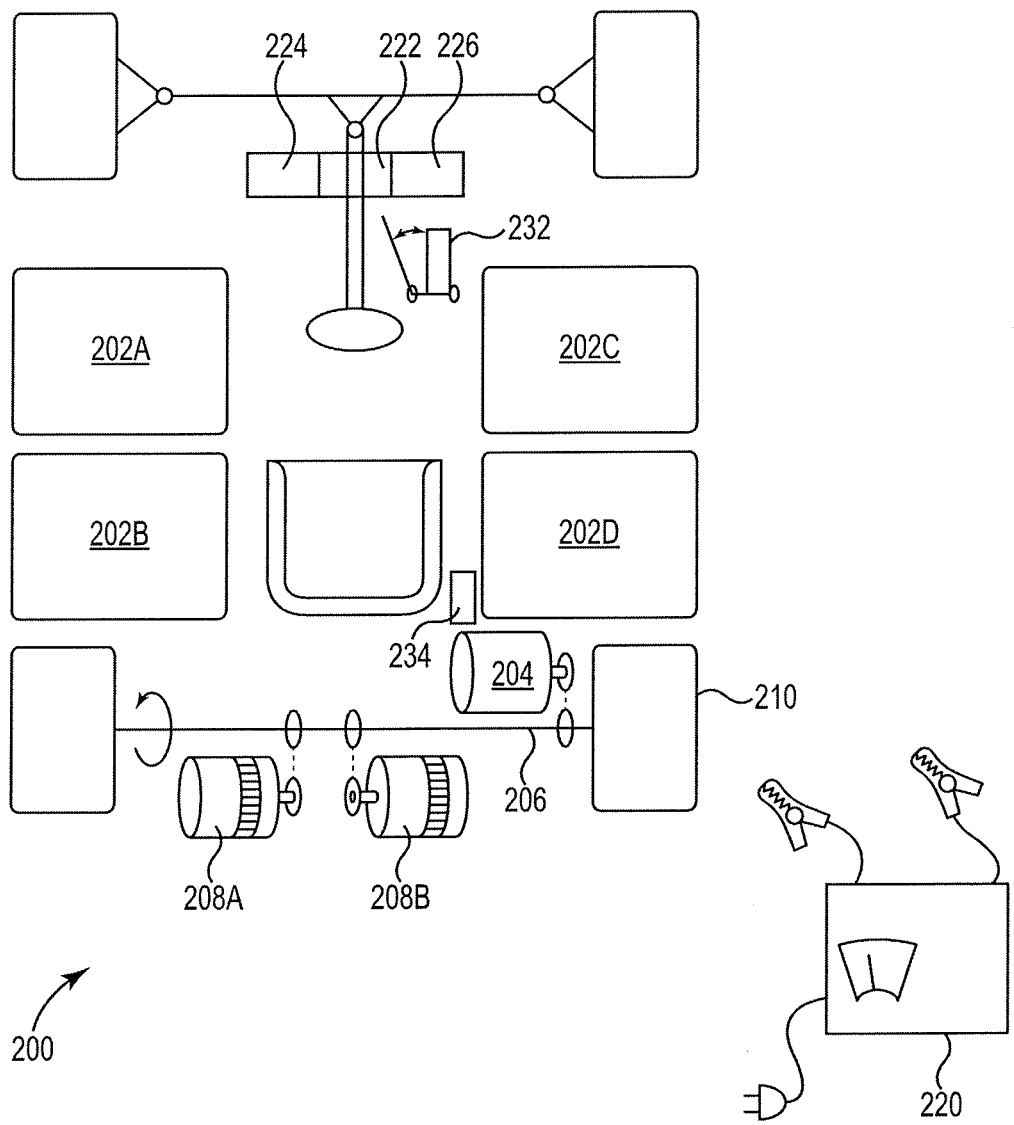
FIG. 2 shows another electric power system with regeneration, according to some embodiments.

Turning now to FIG. 2, another embodiment of an electric power system 200 with regeneration is shown. In this embodiment, the system 200 may include two pairs of electric energy storage elements 202A/B and 202C/D, an electric motor 204, a rotatable shaft 206, and a pair of regeneration components 208A/B. The system 200, like the system 100 of FIG. 1, may be configured for converting the electrical energy of the storage elements 202A/B and 202C/D into rotational energy using the electric motor 204. The regeneration components 208A/B may be configured for converting a portion of the rotational energy back into electric energy to recharge the storage elements 202A/B and 202C/D. In this particular embodiment, the system 200 is shown in conjunction with a take-off device 210 in the form of an axle and a pair of rear wheels of a go kart. Accordingly, a solenoid 224, a computer control box 222, an on/off switch 226, an accelerator pedal 232, and a throttle control 234 are also shown. While the system 200 is shown as part of a go kart, it is to be appreciated that the system 200 may also be used with other take-off devices 210 including vehicles-type devices or energy generation-type devices.

In the embodiment of FIG. 2, the two pairs of electric energy storage elements 202A/B and 202C/D and the electric motor 204 may be the same or similar to the electric energy storage element 102 and electric motor 104, respectively, of FIG. 1. Given the more involved system of FIG. 2, the wiring detail has been omitted on FIG. 2 and has been shown in a more detailed schematic view of the electrical components in FIG. 3. As shown in FIG. 3, the storage elements 202A/B may be connected in parallel providing a pair of storage elements having a similar voltage as the single battery of FIG. 1. The storage elements 202C/D may also be connected in parallel providing another pair of storage elements having a similar voltage as the single battery of FIG. 1. The two pairs of storage elements may then be connected in series with one another providing a (4) element pack of storage elements having a voltage that is approximately double that of the single battery of FIG. 1 and has a longer capacity due to the parallel wiring of each pair of elements 202A/B and 202C/D.

In some embodiments, the storage elements 202A/B may be 12 V batteries and connecting the batteries in parallel may maintain the voltage potential at 12 V's, but may provide a pair of batteries that last longer between recharging sessions. The storage elements 202C/D may also be 12 V batteries and connecting the batteries in parallel may maintain the voltage potential at 12V, but may provide a pair of batteries that last longer between recharging sessions. By connecting the two pairs of batteries 202A/B and 202C/D in series, the voltage potential of the (4) battery pack may provide a 24 volt potential with a battery life longer than that of the single battery shown in FIG. 1. In other embodiments using four batteries, a 48V system may be provided. Still other sizes of batteries, numbers of batteries, and wiring combinations may be provided depending largely on the amount of power needed and partly on the length of time desired. However, it is noted that the regeneration component discussed below also is a factor when considering the length of time the system is needed.

As described with respect to system 100 and FIG. 1, the system 200 may also include a control 222, which may be used to control the motor 204. Accordingly, the control 222 may be connected across the battery pack and may control the speed of the motor 204 and may monitor other aspects of the system 200 allowing the motor to react to changing conditions. While the computer control 222 in FIG. 2 has been shown as being in electrical communication with the battery pack and the motor 104, it is to be appreciated that the control 222 may be in electrical communication with other aspects of the system such as a foot pedal, a throttle, an on/off switch, and the like. Depending on the type of computer control system 222 provided, particular numbers and locations of connections may be provided. In some embodiments, the control 222 may be used to control the field current across the alternator. In one embodiment, the computer control 222 may be a CONTROLLER PRO™ system provided by ALLTRAX™, Inc. of Grants Pass, Oreg., for example. Wiring diagrams are available from ALLTRAX™ that show the connection of a battery pack to the controller and also show connections of other elements including a foot pedal, a throttle, an on/off switch or key switch, a reverse switch, and other features commonly used to operate a go kart. Other go kart related control systems may be provided and still other control systems may be provided for other implementations other than go karts. In some embodiments, combinations of control systems 222 may also be provided.

As shown, the regeneration components 208A/B of the embodiment of FIG. 2, may each be operably coupled to the rotatable shaft 206 of the system 200. Each regeneration component 208A/B may also be in electrical communication with the battery pack such that rotational energy from the rotatable shaft 206 may be converted back into electrical energy and used to recharge the battery pack 202A/B and 202C/D. Accordingly, given similar loading conditions on the systems 100/200 of FIG. 1 and FIG. 2, the system 200 of FIG. 2 may run longer before recharging because of the larger capacity of two batteries 202A/B and 202C/D instead of one and because of the additional regeneration component 208B for recharging the second set of batteries 202C/D. It is noted that the wiring shown in FIG. 3 provides for a dual isolated system where the first regeneration component 208A may function to regenerate batteries 202A/B and the second regeneration component 208B may function to regenerate batteries 202C/D.

In one particular embodiment, the alternators may be provided by LEECE-NEVILLE HEAVY DUTY SYSTEMS™. For example, model 8SC3009ZA may be provided having a voltage and amperage rating of 24 V and 175 amps, respectively. In one embodiment, the alternator may provide approximately 100 amps of 24 volt output when operating at a rate of 3200 RPMs. Other amperage outputs may be provided by operating the alternator at differing speeds and/or by adjusting the field current of the rotor. Operational curves may be obtained from the manufacturer of the alternators and suitable operating rates may be selected based on the desired return of electrical energy to the batteries. Gear ratios between shaft 206 and the alternator may be selected to achieve the desired operating rate. At least one set of gear ratios are discussed immediately below. In some embodiments, the alternator may be run at a rate to have an output ranging from approximately 60 amps to 175 amps, or from approximately 80 amps to approximately 140 amps, or from approximately 100 amps to approximately 120 amps. Still other amperage outputs from the alternators may be selected and used.

In the embodiment shown, the motor 204 and the alternators 208A/B are shown as being operably coupled to the shaft 206 with chains and sprockets. In some embodiments, the gear ratio provided between the motor and the shaft may be based on a 14 tooth sprocket on the motor chained to a 63 tooth sprocket on the shaft 206. As such, the shaft may rotate slower than the motor. Other sprocket sizes may be used including sprocket sizes where the motor sprocket is larger than the shaft sprocket. In some embodiments, the gear ratio provided between the shaft and the alternators may be based on a 53 tooth sprocket on the shaft chained to a 14 tooth sprocket on the alternators. As such, the alternators may rotate faster than the shaft 206. Other sprocket sizes may be used including sprocket sizes where the shaft sprocket is smaller than the alternator sprocket.

As with the system 100 of FIG. 1, the system 200 of FIG. 2 may include one or more recharging components 220 for recharging the batteries 202A/B and 202C/D when they drop below a state of charge sufficient to perform a task. Also like the system 100 of FIG. 1, and as mentioned, the system 200 of FIG. 2 may be used to power a variety of different take-off type devices 210 including mechanical type devices and/or generator type devices 210.

Turning now to FIGS. 4 and 5, yet another embodiment of an electrical power system 300 with regeneration is shown. In this embodiment, two pairs of electric energy storage elements (302A/B and 302C/D) are provided, a single motor 304 is provided, and two regeneration components 308A/B (e.g., alternators) are provided. A solenoid 324, a computing device 322, and an on/off switch 326 are also shown. In addition, a generator 328 is provided and a battery charger 320 is also provided. That is, the take-off device in this embodiment may be a generator 328 in lieu of an axle/wheel set of a go kart like FIGS. 2 and 3. This embodiment is an example of how, when a generator 328 is provided, the generator 328 may be used in the regeneration process in addition to the alternators 308A/B. That is, where the rotational energy is converted to electrical energy by a generator 328 to provide for powering electronic devices or systems, for example, the generator may also be used to power a battery charger 320 allowing for an additional battery boost by recharging of the batteries 302A-D with the charger 320. Due to the additional information provided on FIG. 4 compared to that of FIG. 1, for clarity, the wiring detail has been omitted on FIG. 4 and has been shown in a more detailed schematic view of the electrical components in FIG. 5.

The system 300 of FIGS. 4 and 5 may function similar to that of the systems 100/200 of FIGS. 1-3. That is, the battery power may be used to power an electric motor 304, which may, in turn, rotate a shaft 306. The regeneration components 308A/B may be operably coupled to the shaft 306 to return a portion of the rotational energy back to the batteries 302A-D for recharging. The motor 304, shaft 306, and alternator 308A/B arrangement and type of this system 300 may be the same or similar to that described with respect to the system 200 of FIG. 2. Accordingly, much of the discussion of FIGS. 4 and 5 relates to the added generator and battery charger.

In this embodiment, a generator 328 is shown as a take-off device 310, which may be used to covert rotational energy to electrical energy for powering electronic devices. In one example, applicants converted a gas generator for use in the present system. That is, the electricity generating portion of the generator was rotationally coupled to the shaft 306 instead of the crank shaft of the combustion engine of the off-the-shelf generator. Accordingly, the electricity available at the outlets of the generator resulted from the rotational energy in the shaft 306 instead of the rotational energy of the crank shaft of the generator. The conversion of a gas generator may include use of an adapter.

In one embodiment, the converted generator may be a CASE IH™ 9000 watt gas generator. This generator may be commonly used as a generator for powering a home. However, other types and sizes of generators may be used. The generator may be run at a rate ranging from approximately 1500 RPMs to approximately 4500 RPMs. In some embodiments, the generator may be run at 1600 RPMs or 1850 RPMs. In still other embodiments, the generator may be run in a range extending from approximately 3000 RPMs to 4000 RPMs, or from approximately 3200 RPMs to approximately 3800 RPMs or from approximately 3400 RPMs to approximately 3700 RPMs. Depending on the size of the generator and the desired application, other rotation rates may be provided for operating the generator. Curves may be obtained from generator manufacturers to determine desirable rates or ranges for operating a particular generator. In some embodiments, based on system power, regeneration capacity, or other factors, the generator may be run at an optimal rate (low input, high output) or the generator may be run below or above the optimal rate.

The rate of the generator may be controlled by a combination of the rate of the motor 304, the gear ratio between the motor 304 and the shaft 306 and the gear ratio between the shaft 306 and the generator 328. In some embodiments, the gear ratio of the motor 304 to the shaft 306 and the shaft to the alternators may be the same or similar to that described with respect to the system 200. In addition, the gear ratio between the shaft 306 and the generator 328 may be based on a chained coupling between an 80 tooth sprocket on the shaft and a 14 tooth sprocket on the generator. Still other gear ratios may be provided including those that are based on a sprocket on the shaft 306 that is smaller than the sprocket on the generator 328 and may be selected to achieve a desired RPM rate for the generator.

The generator 328 may include a generator control panel 330 for controlling the generator 328. For example, the generator control panel 330 may include an on/off switch in addition to gauges showing the electrical output of the generator 328 and the like. In some embodiments, the load imparted on the system 300 by the generator 328 may be monitored and controlled based on the status of the system 300 and the need for additional power for electronic systems. Additionally, for example, the amount of energy sent back to the batteries 302A/B and 302C/D may also be controlled by controlling the output of electricity to the battery charger 320, for example.

As shown in FIG. 5, the system 300 may be wired similar to the system of FIGS. 2 and 3. The positive pole of battery 302A may be wired to the positive pole of the solenoid 324. The negative pole of the solenoid 324 may be connected to the computer 322, which may also be connected to the negative pole of battery 302C. The battery charger 320 may be connected between the positive pole of battery 302A and the negative pole of battery 302C. One of the alternators 308A may be connected between the positive pole of battery 302A and the negative pole of battery 302C. The other alternator 308B may be connected between the positive pole of battery 302B and the negative pole of battery 302D. The grounds of the respective alternators 308A/B may connected to one another. Batteries 302A and 302B may be connected in parallel where each of their respective positive poles are connected and their respective negative poles are connected. Similarly, batteries 302C and 302D may be connected in parallel. The negative pole of battery 302B may be connected to the positive pole of battery 302D providing a series wiring of each pair of parallel connected batteries 302A/B and 302C/D.

In some embodiments, a timer or a monitor may be used to intermittently provide a power boost to the batteries from the generator. In the case of a timer, a time interval may be selected based on the load on the system and the need for a power boost to the batteries. At particular time intervals, the generator may provide power to the battery charger 320 allowing the batteries to receive a power boost. In the case of a monitor, the voltage output or other parameter of the battery status may be monitored and when the output reaches a low enough level, the generator may provide power to the battery charger 320 allowing the batteries to receive a power boost. While the timer/monitor has been described as a part of the generator, it could also be a part of the battery charger and may control whether the charger 320 is activated or not. The timer/monitor may also be a separated device configured for controlling the generator 328, the charger 320, or both. In other embodiments, the power boost from the generator 328 and charger 320 may be constantly applied.

In still further embodiments, the system may include devices or systems for harnessing solar power. For example, any of the systems described in FIGS. 1-5 may include a solar panel for harnessing solar energy and for directing the energy to the battery or batteries of the system to keep them charged. In some embodiments, the panel may include a relatively small panel near and adjacent to the system for purposes of portability. In other embodiments, where, for example, the system is used as a generator for a home, the solar panel may be larger and may be relatively remote from the system, wired thereto, and located, for example on the roof of a home or on a stand in an open field, for example. In still other embodiments, the solar panel may be decoupleable from the system and used as a recharging station where, for example, the system is moved away from the panel such as when the system is part of a vehicle or other transportable device and the panel is not transportable. Still other arrangements and methods of incorporating solar power into the systems 100, 200, or 300 may be provided.

The systems 200/300 may be activated by turning the on/off switch 226/326 to the on position, which may place the batteries 202/302A-D in electrical communication with the electric motor 204/304 across the solenoid 224/324. When the foot pedal 232/332 is depressed, the solenoid 224/324 may be activated thereby allowing current from the batteries 202/302A-D to flow to the motor 204/304. The foot pedal 232/332 and throttle control 234/334 may be used to adjust the power provided to the electric motor 204/304 and thereby control the speed of the rotating shaft 206/306. It is noted that, in one embodiment, the systems 200/300 relies on an ALLTRAX™ type control system 222/322 and, as such, relies on control components similar to that of a go kart. For example, the computer 222/322 may be in electrical communication with the foot pedal 232/332, the throttle 234/334, the motor 204/304, and/or other components of the system 200/300. It is to be appreciated that other control systems 222/322 may be developed or purchased and for energy generation systems like that of system 300, other non-vehicle type controls may be developed or purchased for use with the system and adapted to suitably control an energy generator system. The control systems 222/322 may monitor and react to conditions of the system 300 including the demand for power from the throttle 234/334 as well as, for system 300, the load of the generator 328 or other take-off devices 310 or systems. In some embodiments, the computer 222/322 may, for example, be in electrical communication with the regeneration components 208/308A/B and may increase the field current across the alternators 208/308A/B when the rotational energy is not being otherwise used, thereby allowing for maximizing the return of energy to the batteries 202/302A/B. Where a larger load is being placed on the system 200/300, the field current across the alternators 208/308A/B may be reduced or altered, for example.

The concepts presented in this patent application relate to electric power with a regeneration component. In the context of go karts, for example, there is an industry trend going away from gas powered carts to electric powered carts. However, with current technologies, the carts need to be continually charged throughout the day causing a need to rotate the carts through a charging station to keep charged carts available to customers. This is a strenuous, cumbersome, and time consuming task. While this problem may be the origination of some of the developments presented in this patent application, the regeneration success of the system has been surprising and has led to the generator embodiments described. Below is an example relating to a go kart system showing the dramatic increase in usability of the system when the regeneration components are added.

Prior to any use of regeneration components, a go kart system with a four battery pack was tested. The go kart was placed on a stand to keep it stationary and the cart was operated for 47 minutes, after which the batteries of the system were dead.

With alternators in place, the system shown in FIGS. 2 and 3 having dual isolated alternators as regeneration components was tested. The alternators were of the type described with respect to FIGS. 2 and 3 and the control system was an ALLTRAX™ type control system. The system was run for 16 hours with some of the testing being on stand/rack and some of the testing being conducted on a track. Readings of voltage output of the battery pack were taken at 20 minute intervals. As can be appreciated from the results shown in the below Table I, the system lasted considerably longer and, while the voltage output of the batteries decreased, it only decreased 12% in sixteen hours.

TABLE I

| Cumulative Hours/Minutes | Voltage Reading | Track/Rack |
|---|---|---|
| Start | 24.8 | Rack |
| 20 | 24.7 | Rack |
| 40 | 24.7 | Rack |
| 1:00 | 24.6 | Rack |
| 1:20 | 24.6 | Rack |
| 1:40 | 24.6 | Rack |
| 2:00 | 24.5 | Rack |
| 2:20 | 24.4 | Rack |
| 2:40 | 24.4 | Rack |
| 3:00 | 24.3 | Rack |
| 3:20 | 24.2 | Track |
| 3:40 | 24.2 | Track |
| 4:00 | 24.1 | Track |
| 4:20 | 24.1 | Track |
| 4:40 | 24 | Track |
| 5:00 | 23.9 | Track |
| 5:20 | 23.8 | Track |
| 5:40 | 23.8 | Track |
| 6:00 | 23.7 | Track |
| 6:20 | 23.7 | Track |
| 6:40 | 23.6 | Track |
| 7:00 | 23.5 | Track |
| 7:20 | 23.4 | Rack |
| 7:40 | 23.4 | Rack |
| 8:00 | 23.3 | Rack |
| 8:20 | 24.0 | Rack |
| 8:40 | 24.0 | Rack |
| 9:00 | 23.2 | Rack |
| 9:20 | 23.2 | Rack |
| 9:40 | 23.1 | Rack |
| 10:00 | 23.0 | Rack |
| 10:20 | 22.9 | Rack |
| 10:40 | 22.9 | Rack |
| 11:00 | 22.8 | Rack |
| 11:20 | 22.8 | Rack |
| 11:40 | 22.7 | Rack |
| 12:00 | 22.6 | Rack |
| 12:20 | 22.5 | Rack |
| 12:40 | 22.4 | Rack |
| 13:00 | 22.4 | Rack |
| 13:20 | 22.3 | Rack |
| 13:40 | 22.3 | Rack |
| 14:00 | 22.2 | Rack |
| 14:20 | 22.1 | Rack |
| 14:40 | 22.1 | Rack |
| 15:00 | 22.0 | Rack |
| 15:20 | 21.9 | Rack |
| 15:40 | 21.9 | Rack |
| 16:00 | 21.8 | Rack |

The above results reveal some surprising results given commonly understood principles about loss of energy during conversion of energy from one form to another. The present arrangement of systems allows for recovering of energy while providing an output of energy thereby prolonging the amount of time a source of stored electric energy may be used.

Although the present invention has been described with reference to preferred embodiments, persons skilled in the art will recognize that changes may be made in form and detail without departing from the spirit and scope of the invention. In particular, each of the three embodiments described from FIGS. 1 to 5 tend to increase in sophistication and while the embodiment of FIG. 1 may include less features and components than FIGS. 2 and 4, for example, one, some, or all of the features of FIGS. 2 and 4 may individually or collectively be incorporated into the system of FIG. 1. In particular, while little has been said of the computing device with respect to FIG. 1, a computing device may be provided to control the motor 104, the field current in the alternators 108 or other aspects of the system 100. Still other aspects of the systems of FIGS. 2-5 may be selected for incorporation into the system 100 and portions of the system 300 may be incorporated into the system 200.

Figure 6:
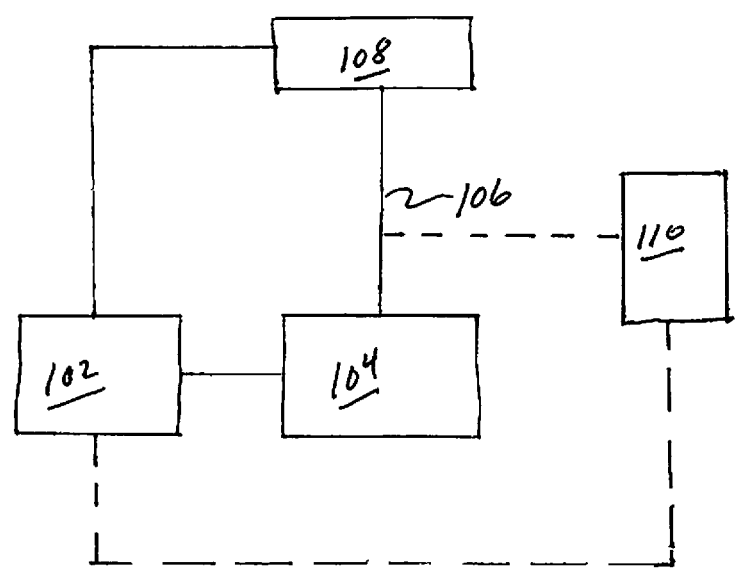
FIG. 6 shows a wiring diagram of embodiments of the present invention.

For example, FIG. 6 illustrates several embodiments of the present invention. Solid connection lines indicate connections between the electric motor 104 and the regeneration component 108, and the regeneration component 108 and the electric power storage element 102. As discussed above, the electric motor 104 is in direct connection with rotatable shaft 106 which is, in turn, in direct connection with the regeneration component 108. Thus, regeneration component 108 is adapted to recharge electric power storage element 102 which may comprise at least one battery that undergoes recharging. The dashed lines indicate alternate embodiments of the present invention. Thus, dashed line between rotatable shaft 106 and take-off device 110 may be present as, e.g., in the case of a drive train or axle of a vehicle, a propulsion system of a boat, or a generator. In addition, dashed line between take-off device 110 and the electric power storage element 102 may also be present and adapted, as discussed above, for recharging the electric power storage element 102 which may further comprise at least one battery that undergoes recharging as a result of the connection with regeneration component 108 as well as with the take-off device 110.

What is claimed is:

1. An electric power system with regeneration, comprising:
   at least one battery;
   an electric motor in electrical communication with the at least one battery;
   a rotatable shaft directly coupled to the electric motor;
   a regeneration component directly connected to the rotatable shaft and in electrical communication with the at least one battery and adapted to recharge the electric power storage element;
   at least one take-off device indirectly and operably coupled with the rotatable shaft, the at least one take-off device comprising a generator, the generator in electrical communication with the at least one battery and adapted to recharge the at least one at least one battery; and
   a battery charger adapted for an electrical connection and communication with the at least one battery when the rotatable shaft is not rotating and further adapted to not be in electrical communication with the at least one battery when the rotatable shaft is rotating, wherein the battery charger is adapted to recharge the at least one battery.

2. The electric storage device of claim 1, wherein the at least one take-off device further comprises at least one selected from the group consisting of: the drive train of an automobile, an axle of an automobile, the drive train of a golf cart, an axle of a golf cart, the drive train of a farming implement, an axle of a farming implement, the drive train of a go-kart, an axle of a go-kart, and the propulsion system of a boat.

3. The electric power system of claim 2, further comprising the battery charger in electrical communication with the generator.

4. The electric power system of claim 1, wherein the generator comprises an electrical connection adapted for connecting with at least one electrical device.

* * * * *